Feb. 8, 1949.  F. M. ADAIR ET AL  2,460,964
APPARATUS FOR MOLDING
Filed Sept. 29, 1942  3 Sheets-Sheet 1
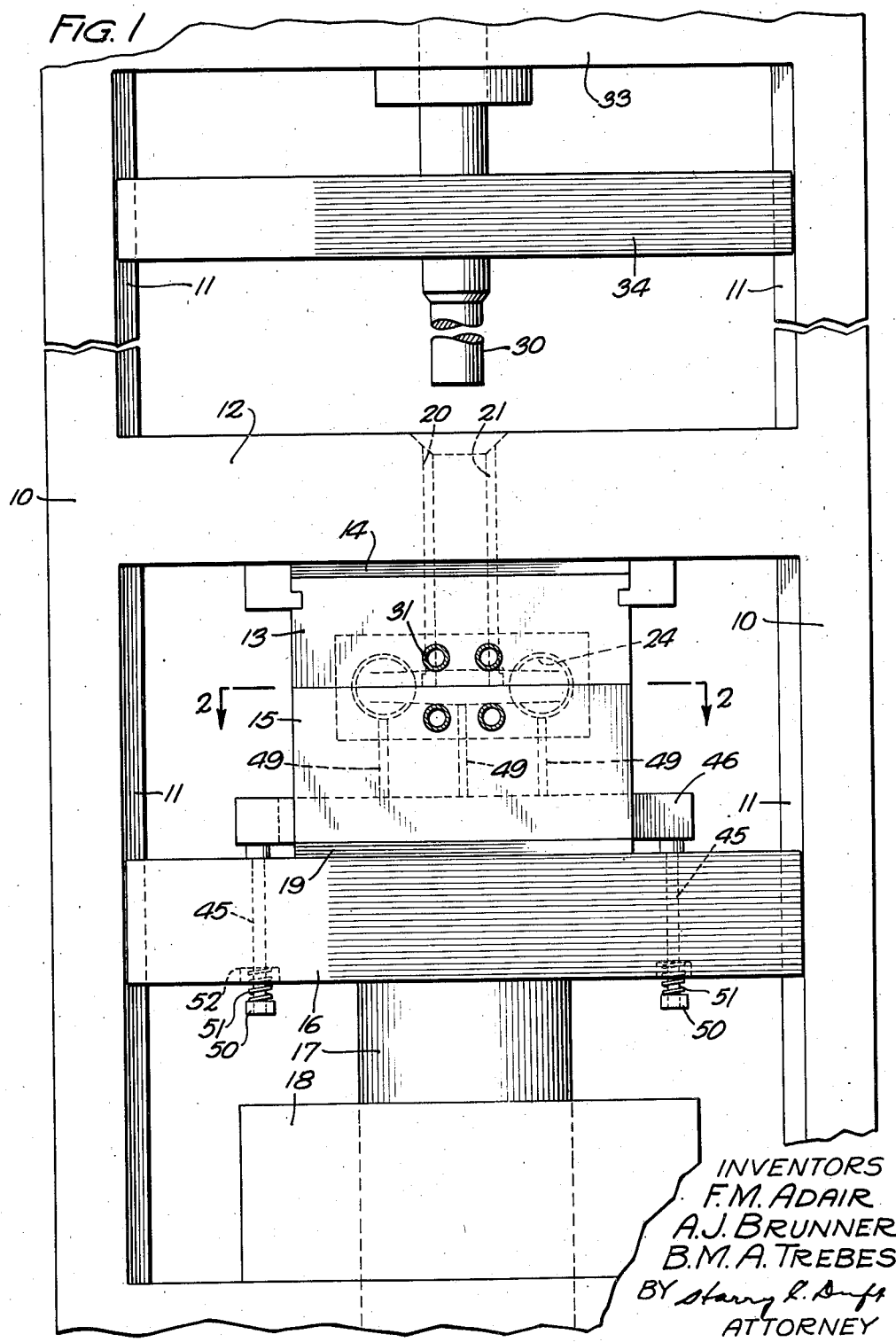
INVENTORS
F. M. ADAIR
A. J. BRUNNER
B. M. A. TREBES
BY
ATTORNEY Feb. 8, 1949.  F. M. ADAIR ET AL  2,460,964
APPARATUS FOR MOLDING
Filed Sept. 29, 1942  3 Sheets-Sheet 2
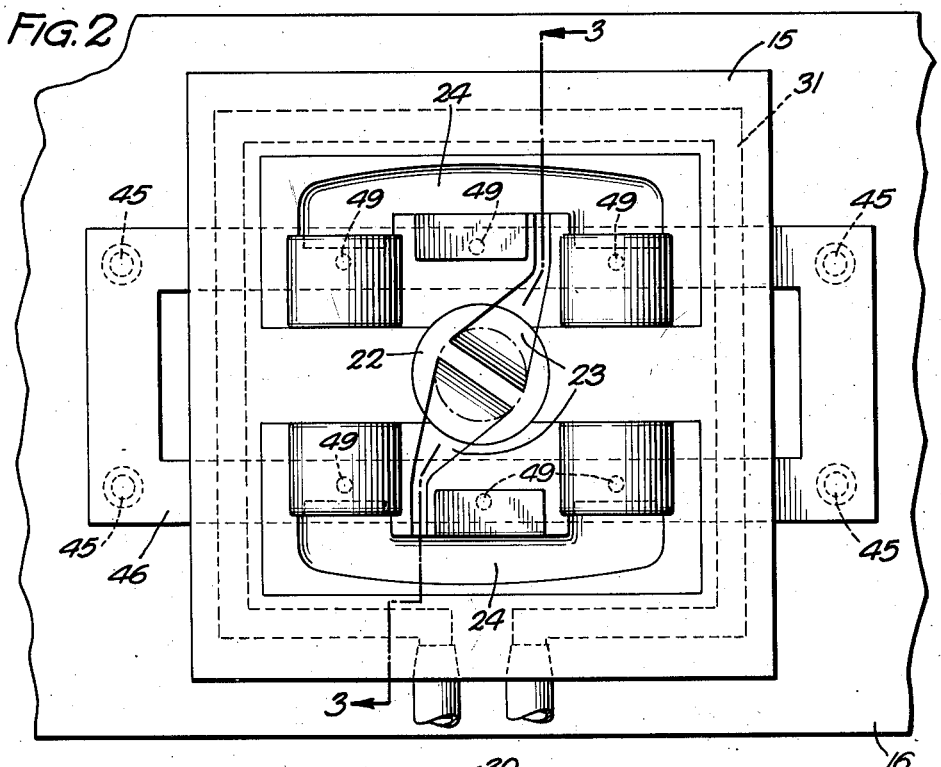
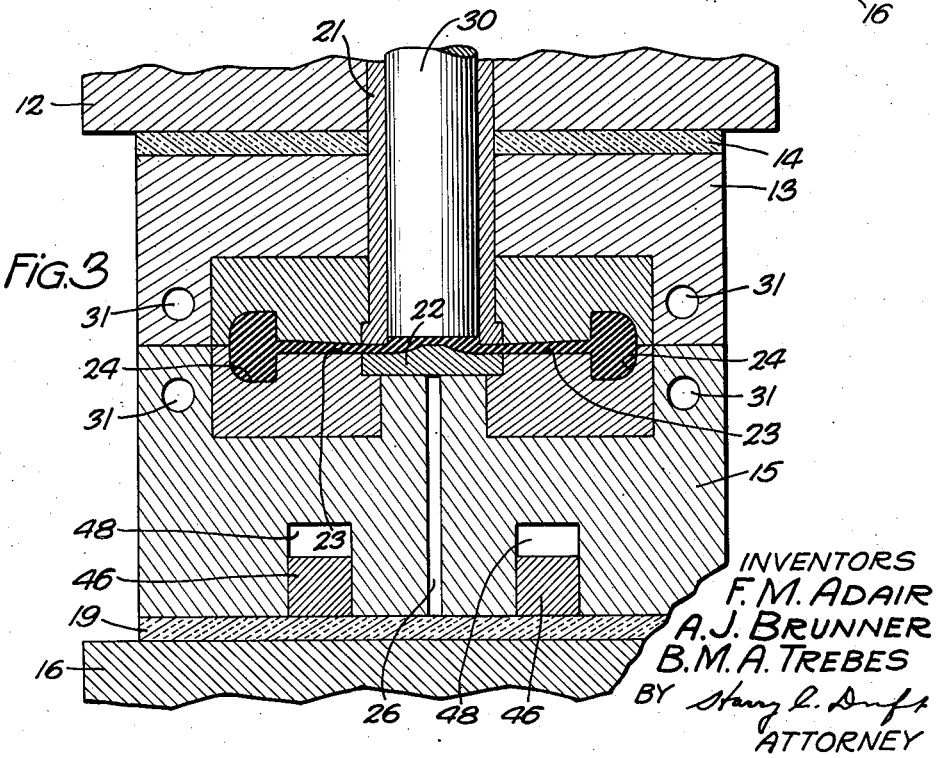
INVENTORS
F. M. ADAIR
A. J. BRUNNER
B. M. A. TREBES
BY
ATTORNEY Feb. 8, 1949. F. M. ADAIR ET AL 2,460,964
APPARATUS FOR MOLDING
Filed Sept. 29, 1942 3 Sheets-Sheet 3

INVENTORS
F. M. ADAIR
A. J. BRUNNER
B. M. A. TREBES
BY *Harry L. Duft*
ATTORNEY

Patented Feb. 8, 1949

2,460,964

UNITED STATES PATENT OFFICE 2,460,964

APPARATUS FOR MOLDING

Frank M. Adair, Berwyn, Anton J. Brunner, Congress Park, and Bruno M. A. Trebes, Berwyn, Ill., assignors to Western Electric Company, Incorporated, New York, N. Y., a corporation of New York Application September 29, 1942, Serial No. 460,064

1 Claim. (Cl. 18—30)

This invention relates to an apparatus for molding, and more particularly to an apparatus for injection molding thermosetting materials.

In the injection molding of thermosetting materials, the materials must be plasticized under heat and pressure to render them fluid and then, before the materials become infusible, they must be injected into the molding die where they are set or cured. Under high pressure and temperature, the period between plasticity and infusibility may be relatively short and, consequently, difficulties have been encountered in some cases in avoiding setting of the material in the extrusion chamber or, on the other hand, injecting it into the die before it is properly conditioned.

Objects of the present invention are to provide an effective and efficient apparatus for injection molding thermosetting materials.

In accordance with one embodiment of this invention, a molding apparatus is provided having a small diameter, heated extrusion cylinder from which the material is expressed laterally through a thin rectangular runner to a heated molding cavity in close proximity to the extrusion cylinder.

Other objects and advantages will appear from the following description, taken in conjunction with the accompanying drawings, in which Fig. 1 is a front elevation of a portion of a molding apparatus embodying the invention;

Fig. 2 is a sectional view taken on line 2—2 of Fig. 1;

Fig. 3 is a sectional view taken on line 3—3 of Fig. 2;

Figure 5:
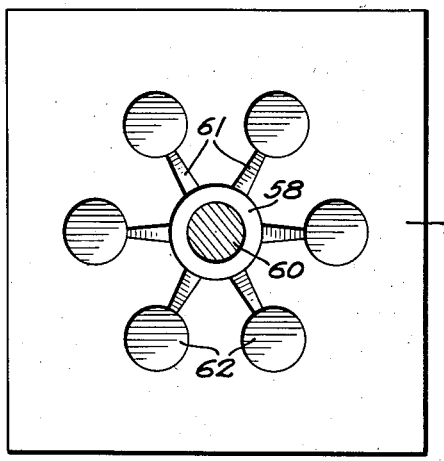
Fig. 5 is a sectional view taken on lines 5—5 of Fig. 4.

Thermosetting molding materials, such as the phenol aldehyde resins, are so designated because the application of sufficient heat and pressure thereto causes them to solidify or set. Thus, it is necessary that molding be completed before the curing is finished or the material will no longer be plastic enough to be injectible. Generally the material when injected into the mold has only begun to cure and, consequently, curing must be completed in the mold. With a large molded article, because of the poor heat conductivity of most thermosetting compounds, this heat treatment in the mold must be relatively long to effect a cure as compared with smaller objects, and thereby increases manufacturing costs. Also, because of the poor thermal conductivity, plasticizing prior to injection must be carried out under controlled temperature and pressure in order to be uniform and thorough so that the molding material will be disposed uniformly throughout the mold cavity.

Referring now more in detail to the drawings, and particularly to Fig. 1, a portion of a molding apparatus is shown having upright columns 10 connected by an integral bolster plate 12. This bolster plate has an upper die section 13 rigidly attached to the underside thereof and is thermally insulated from the bolster plate by a sheet of heat insulating material 14. A lower die section 15 is rigidly mounted on a movable bolster plate 16 which is supported on a hydraulically operated ram 17, operable in a hydraulic cylinder 18. Thus, by moving the bolster plate 16 up and down, the mold sections 13 and 15 may be moved to closed and opened positions. The lower die section is similarly thermally insulated from the bolster plate 16 by a sheet 19 of thermally insulating material.

The die sections are heated by passing steam or other heated gases or fluids through a plurality of apertures 31 in the die sections. It will be noted that the entire extrusion portion of the extrusion cylinder is in the upper die section so that it will also be subjected to the heat of the die. Electrical heating units may also be employed to heat the die sections.

The bolster plate 12 has a cylindrical aperture 20 therein and a sleeve 21 of hardened material, which forms a lining for this aperture, extends downwardly through a similar aperture in the upper die section to form an extrusion chamber in the upper die section, while the upper extension thereof in the bolster plate serves as a receiving chamber for the material to be molded. As may be best seen in Fig. 3, the lower end of the extrusion chamber is formed by the lower die section 15. In view of the high pressures applied to the molding materials and the abrasive effect of the flowing of these materials, the die section 15 is provided with a hardened insert 22, immediately under the extrusion chamber. A knockout aperture 26 extends through the lower die section to permit insertion of a tool to remove this insert when necessary.

The bottom of the extrusion chamber is flat, or substantially flat, and outlet orifices or runners 23 communicating with molding cavities 24 extend laterally from the periphery of the bottom of the extrusion chamber. This construction permits the die cavities 24 to be placed in close proximity to the extrusion chamber. These runners are preferably rectangular cross section and are made greater in width than thickness. The thickness or height of the runners should be as small as possible in order to spread out and thus to expose a maximum amount of the molding material to the heat of the die to plasticize it and to complete the heating of the material. When the optimum runner thickness has been determined for a particular material, the volume or the cross sectional size of the runner is selected by varying its width in accordance with the pressure and temperature to be used, as will be hereinafter explained.

It has been found that it requires less pressure to extrude molding material laterally from the periphery of a flat bottomed extrusion chamber than it does, for example, in the case where the outlet from the extrusion chamber is in the center of the bottom of the extrusion chamber. This is due in part to the fact that heat is applied to the exterior of the chamber and in part to geometrical considerations. By forming the runners on the dividing line of the die, the distance the molding material is required to travel from the extrusion chamber to the mold cavity is kept at a minimum. At the same time, machining expense is also greatly reduced. Furthermore, since the runners are formed on the dividing line of the die, when the sections are separated and the molded article is ejected, the sprue, that is the residue or waste portion of the molding material remaining in the runners and at the base of the extrusion chamber, may be ejected simultaneously with the molded article. This is a highly desirable feature since it greatly speeds up the cycle of operation. Also the flat type plasticizing surface afforded by using runners of this shape results in a substantially smaller residue.

In practice, it has been found that curing is completed in a very short time when following this invention and that uniformity of curing is greatly increased. The transfer of heat is so rapid in some cases that where the runners are of necessity relatively long, it is necessary to taper the runners as shown in Fig. 2 in order to increase the velocity of the material as it is injected and, thus, to reduce the time the material is exposed to the heating surface prior to injection. If this were not done, the material might polymerize completely in the runner and become impossible to inject.

The diameter of the extrusion chamber should be as small as possible consistent with the volume of material to be extruded. It has been found that best results are obtained where the extrusion chamber is of such a diameter that the length of the extrusion portion of the extruding stroke is at least as long as, and preferably longer than, the diameter of the extrusion chamber. For one thing, the smaller diameter extrusion chamber results in a smaller residue at the bottom of the chamber, but more important is the fact that a smaller diameter extrusion chamber requires less pressure on the ram to achieve a relatively higher extrusion pressure as compared with a larger diameter extrusion chamber and heat transfer to the material is increased. A diameter must be selected which will give an extrusion pressure great enough to extrude the material with sufficient velocity so that it will not set up in the extrusion chamber or runner before the molds are filled. While a high pressure is desirable from the point of speeding up injection and obtaining a tightly compacted molded article, too high a pressure may cause injection of the material before polymerization of the material is sufficient advanced. This may have two undesirable effects: in the first place, if the material is sufficiently fluid, it will be extruded through the interstices between the sections or through the vents, causing excessive flashing. Second, and more important, unless the material is substantially completely heated prior to injection, an inadequately cured article may result. Since any heating after injection must be by conduction and since the thermal conductivity of thermosetting materials, as aforesaid, is very low, only the material nearest the walls of the mold cavity will be heated further after injection. Obviously, if the article be left in the mold long enough, the heat would penetrate; however, this is not economical and it is desirable that the heating be completed as far as possible commensurate with injectability, except for the time of application of the heat, prior to the material being injected into the mold. Thus, the exact pressure and temperature must be selected with great care.

With the foregoing in mind, it may be said generally that the selection of the exact extrusion pressure depends upon the temperature of the dies, type of molding material, cross sectional size of the runners and the length the material has to travel. Obviously, in most cases, the proper pressure must be determined experimentally. Even with a given runner size and temperature, the curing time of different thermosetting materials varies widely. Generally speaking, however, the higher the temperature, the greater the pressure should be; this increase is not proportional, however, as there is some improvement in the flow of the material due to increased plasticity at higher temperatures. If the cross sectional size of the runners is increased, the extrusion pressure may be reduced. On the other hand, if the distance of travel be increased, the pressure must also be increased.

As an illustration of a molding operation, as shown in Figs. 1 to 3, a molding die is provided for molding a hand-set handle for a telephone set. This die is capable of molding two handles at a time, since it has two cavities. Each of these cavities requires about ⅝ of a pound of molding material when a material such as phenol formaldehyde resin is used. An extrusion chamber having a diameter of about 3" is used and the length of the extrusion portion of the extrusion stroke is about 5". Using a temperature of about 365° F. and an extrusion pressure of about 18,000 pounds per square inch with runners approximately ⅛" thick, a width of approximately 2" at the gate, tapering as necessary, and a length of approximately 3", an injection time of about 20 seconds is required. Curing is then completed in the mold cavity in approximately 2 minutes.

In the operation of this apparatus, the ram 17 is actuated to elevate the lower die section and to bring it into contact with the upper die section with the desired pressure. It will be apparent that the greater the pressure exerted by the extrusion ram, the greater will be the hydrostatic pressure within the die sections, and consequently, the greater must be the pressure exerted by the clamping ram 17 to prevent the sections from separating. Thus, the precise pressure to be used on ram 17 must be accurately determined.

If too great a pressure relatively to the extrusion pressure is used in clamping the sections together, the die may be warped and leakage of the material occur. On the other hand, if too little pressure relatively to the extrusion pressure is used, the sections may separate. In determining the pressure to use, an extrusion pressure is first selected as indicated above. Then the area of the extrusion chamber, associated runners and molding cavity is ascertained to determine the hydrostatic pressure per square inch within the die sections tending to separate the sections. Then the area of the clamping surface is ascertained to determine how much force the ram 17 must exert to obtain a clamping pressure which will exceed the hydrostatic pressure by about 5%. Thus, if the hydrostatic pressure is 10,000 pounds per square inch, a clamping pressure must be developed by the clamping ram of about 10,500 pounds per square inch to keep the sections tightly clamped together. It will be apparent that the maximum extrusion pressure obtainable is limited by the maximum clamping pressure obtainable.

The die sections being tightly clamped together, a measured quantity of molding material is then placed in the extrusion chamber and a hydraulically operated extrusion ram 30 actuated to extrude the material. This ram is mounted on a cross beam 33 and extends through a vertically movable guide beam 34 to which it is fixed, the ends of the beam 34 being grooved so as to run over a projecting portion 11 of the standards 10. Thus, the beam serves as a vertical guide for the ram. The bolster plate 16 is similarly grooved at its ends and runs over the projecting portion 11. In this way, vertical alignment of the die sections is maintained.

The lower portion of the ram 30 is provided with a coating of brass or other soft metal approximately .01" thick. This metal may be brazed or welded on the ram and is substantially softer than the metal used for the lining sleeve 21 of the extrusion chamber. By having a substantial disparity in hardness between the ram surface and the sleeve surface, scoring of the ram or of the sleeve is avoided and at the same time a closer contact obtained. The coating may be increased to approximately .02" without being substantially deformed by the extrusion pressures. On the other hand, a coating at least .005" thick must be had to provide adequate protection from scoring.

The provision of means for clamping the die sections together independent of the extrusion means is an important feature of the present invention. One ram, in this case ram 17, clamps the die sections together, while a second ram, ram 31, independently actuated and controlled, is provided to extrude the material into the mold cavities. Thus, considerably higher extrusion pressures may be obtained since the effect of the hydrostatic pressure may be nullified by increasing the pressure exerted by the ram for clamping the sections together. The upper limit of the extrusion pressure that may be used is limited by the pressure that the die itself will withstand.

The temperature of the die and of the extrusion chamber should be from 300° F. to 400° F. Temperatures above 400° F. tend to char the material and a temperature as high as possible which will not char the material should be used. It has been found that under a high pressure and temperature, the material plasticizes very rapidly and as soon as it plasticizes, it begins to flow. Thereafter it may be injected into the mold with the desired velocity bearing in mind that if the extrusion time is too long, the material will set in the extrusion chamber and in the runners and it will be impossible to inject it, while on the other hand, if the extrusion time is too short, the material will not be properly cured in the mold and excessive flashing will occur on the parting line around the mold cavities.

After the mold cavities are filled and the material has cured sufficiently therein, the extrusion ram 30 is reversed and removed from the extrusion chamber and the lower ram 17 is reversed to lower the lower die section. As the lower die section is lowered, a number of vertically positioned rods 45, which extend through the beam 14 and which are attached at their upper ends to a rectangular frame 46, contact the upper surface of the hydraulic cylinder 18. As may be seen in Fig. 3, this frame 46 extends through a pair of recessed portions 48 in the lower die section. Either side of the frame is provided with a number of upwardly extending ejector pins 49. Thus, as the ram 17 lowers the lower die section, the frame 46 remains stationary and the lower die section, moving downward relatively thereto, causes the ejector pins 49 to project into the mold cavity and to eject the molded article therefrom.

To insure retracting of these ejector pins relatively to the die sections, when the sections are again placed together, a collar 50 is attached to the lower end of each actuator rod 45 and one end of a helical spring 51 rests on the upper surface of each collar as shown in Fig. 1. The other end of the spring engages the underside of the cross beam 16 which may be slightly recessed at a point 52 to receive the spring. This spring is compressed when the lower die section is lowered and thus, when this section is again elevated, the spring expands and pulls the rod, frame and ejector pins downward.

Figure 4:
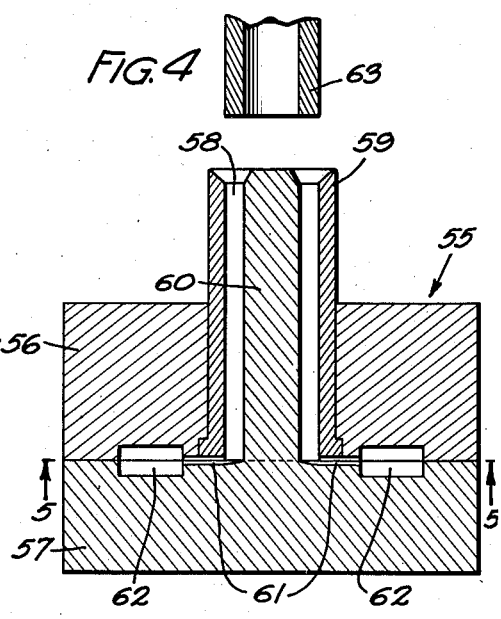
Fig. 4 is a sectional view of a modified form of extrusion cylinder.

Another embodiment of this invention is shown in Figs. 4 and 5. It has been established that whereas the velocity of flow of the molding compound during extrusion is relatively high in the area adjacent the entrance to the runners, the material that is nearer to the mid-point of the extrusion chamber moves much slower. Since this point is heated to the same degree as all other areas in the die section, the die sections being heat saturated when in operating condition, the slower moving material at the mid-point will cure and tend to harden and become immovable. Among other undesirable effects, this may prevent the extrusion ram from traveling its full thrust and thus reduce the pressure obtainable thereby.

This condition is largely avoided by resorting to the ram and die construction illustrated in Figs. 4 and 5. A die 55 here is made in two sections 56 and 57. The upper section 56 has an extrusion chamber 58 formed therein and a sleeve 59 of hardened material to reduce scoring forms the wall of this chamber. The lower die section 57 is provided with an upwardly extending cylindrical portion 60 which, when the die sections are joined together, extends into the extrusion chamber 58. Ribbon-shaped tapering runners 61, such as hereinbefore described, are formed in the upper surface of the lower die section and extend from the extrusion chamber to die cavities 62. A ram 63 of sleeve shape, that is to say, having a hollow center portion, is designed to fit into the annular extrusion chamber formed by the sleeve 59 and cylindrical portion 60 of the lower die section. Ejecting and heating means, such as already described, may be used with this die and ram. The die and ram are intended to be used in a molding apparatus such as shown in Fig. 1, the operation being essentially the same.

Figure 7:
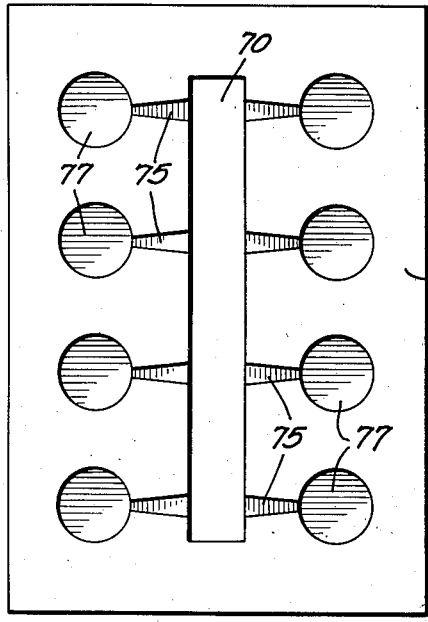
Fig. 7 is a sectional view taken on line 7—7 of Fig. 6.
Figure 6:
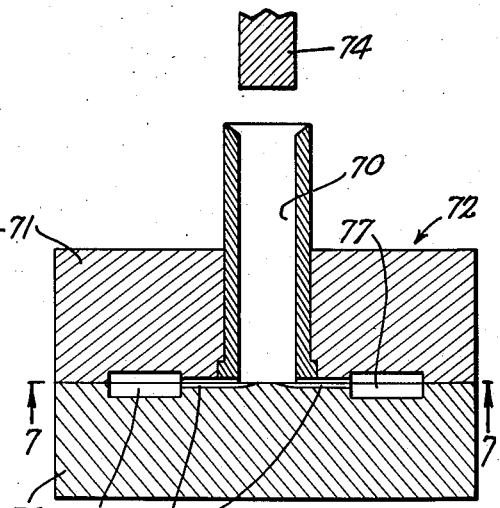
Fig. 6 is a sectional view of another modified form of an extrusion cylinder.

It is sometimes desirable to have a number of molding cavities positioned in line as shown in Fig. 7. For example, in molding an article having elongated inserts where areas of molding material are required only at spaced intervals along the insert, it may be desirable to mold all the areas simultaneously. In order to maintain equal travel distances for the molding material for all the areas and, consequently, to obtain equal pressures and curing at all molding areas, a rectangular extrusion chamber 70, as shown in Figs. 6 and 7, may be formed in an upper section 71 of a die 72. A ram 74 having a rectangular shape is designed to fit into the rectangular extrusion chamber. Ribbon shaped runners 75 are formed in the upper surface of a lower die section 76 and extend from the base of the extrusion chamber to a plurality of mold cavities 77 as shown in Fig. 7. This molding die and ram are designed to be used in an apparatus such as that used in Fig. 1. Heating and ejecting means, as there shown, may also be provided.

While but three embodiments of this invention have been shown and described, it will be understood that many changes and alterations may be made therein without departing from the spirit or scope of the present invention.

What is claimed is:

An apparatus for molding thermosetting resinous material which comprises an extrusion cylinder, a mold having a mold cavity, a runner extending laterally from the base of the extrusion cylinder to said mold cavity, said runner having a width substantially equal to the diameter of said extrusion cylinder at the entrance end thereof, tapering to a narrower width at its outlet end to the mold and having a thickness relatively small in relation to its width, and means for heating said extrusion cylinder, runner and mold to a temperature between 300° F. and 400° F., said runner being of such length as to bring the material to substantially the curing temperature in its passage therethrough.

FRANK M. ADAIR.
ANTON J. BRUNNER.
BRUNO M. A. TREBES.

REFERENCES CITED

The following references are of record in the file of this patent:

UNITED STATES PATENTS

| Number | Name | Date |
|---|---|---|
| 1,865,464 | Geyer | July 5, 1932 |
| 1,916,495 | Shaw | July 4, 1933 |
| 1,918,532 | Geyer | July 18, 1933 |
| 1,993,942 | Novotny | Mar. 12, 1935 |
| 1,997,074 | Novotny | Apr. 9, 1935 |
| 2,033,735 | Pack | Mar. 10, 1936 |
| 2,111,857 | Jeffery | Mar. 22, 1938 |
| 2,216,863 | Visman | Oct. 8, 1940 |
| 2,243,968 | Lester | June 3, 1941 |
| 2,252,107 | Weida | Aug. 12, 1941 |
| 2,254,119 | Lester | Aug. 26, 1941 |
| 2,292,593 | Amigo | Aug. 11, 1942 |
| 2,296,295 | Shaw | Sept. 22, 1942 |

FOREIGN PATENTS

| Number | Country | Date |
|---|---|---|
| 518,294 | Great Britain | Feb. 22, 1940 |
| 541,050 | Great Britain | Nov. 13, 1941 |